(12) United States Patent
Ma et al.

(10) Patent No.: US 9,902,140 B2
(45) Date of Patent: Feb. 27, 2018

(54) DECORATION GLASS AND METHOD FOR MANUFACTURING DECORATION GLASS

(71) Applicant: HON HAI PRECISION INDUSTRY CO., LTD., New Taipei (TW)

(72) Inventors: Hung-Chun Ma, New Taipei (TW); Chen-Chu Chiang, New Taipei (TW); Han-Lung Lee, New Taipei (TW); Chih-Jung Chang, New Taipei (TW); Jih-Chen Liu, New Taipei (TW); Feng-Yuen Dai, New Taipei (TW); Hung-Lien Yeh, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/260,278

(22) Filed: Sep. 8, 2016

(65) Prior Publication Data
US 2017/0341358 A1    Nov. 30, 2017

(30) Foreign Application Priority Data

May 30, 2016  (TW) .............................. 105116931 A

(51) Int. Cl.
*B32B 3/00* (2006.01)
*B32B 37/00* (2006.01)
*B32B 3/10* (2006.01)
*B44C 1/10* (2006.01)
*B32B 17/06* (2006.01)
*B32B 7/12* (2006.01)

(52) U.S. Cl.
CPC .............. *B32B 37/025* (2013.01); *B32B 3/10* (2013.01); *B32B 7/12* (2013.01); *B32B 17/064* (2013.01); *B44C 1/105* (2013.01); *B32B 2315/08* (2013.01)

(58) Field of Classification Search
CPC .. B32B 3/10; B32B 7/12; B32B 17/06; B32B 17/064; B32B 37/025; B32B 2315/08; B44C 5/0407; B44C 1/105
See application file for complete search history.

(56) References Cited

U.S. PATENT DOCUMENTS

2015/0251381 A1*  9/2015  Van Duffel ....... B32B 17/10266
                                                   428/205

* cited by examiner

*Primary Examiner* — Elizabeth E Mulvaney
(74) *Attorney, Agent, or Firm* — ScienBiziP, P.C.

(57) ABSTRACT

A decoration glass includes a transparent base made of glass, the transparent base having a decoration surface; a decoration pattern layer adhered to the decoration surface by an adhesive layer, the decoration pattern layer being made of UV curing ink; and a coating layer deposited on the decoration pattern layer. A method to form a decoration glass is also provided.

12 Claims, 5 Drawing Sheets

DECORATION GLASS AND METHOD FOR MANUFACTURING DECORATION GLASS

This application claims the benefit of priority under 35 USC 119 from Taiwan Patent Application 105116931, filed on May 30, 2016.

FIELD

The present disclosure relates to a decoration glass and a method for manufacturing the decoration glass.

BACKGROUND

Usually, a glass sticker with decoration pattern is used on a surface of a glass, to improve visual effects of the glass. However, the glass sticker often fails to stick when cleaned or wet.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
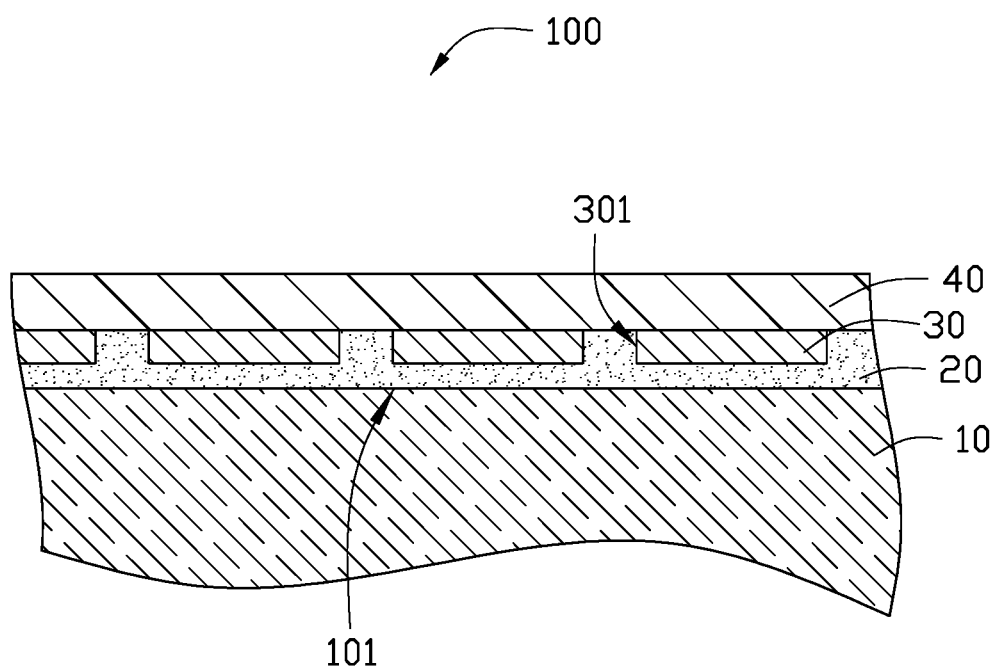
FIG. 1 is a cross-sectional view of a decoration glass according to a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

A decoration glass includes: a transparent base having a decoration surface; a decoration pattern layer adhered to the decoration surface by an adhesive layer, the decoration pattern layer being made of UV curing ink; and a coating layer deposited on the decoration pattern layer.

A method to manufacturing a decoration glass, includes: providing and successively stacking a transparent film, a releasing film and a coating layer to form a first multilayer film; forming a decoration pattern layer on a surface of the coating layer, the decoration pattern layer is made of UV curing ink; providing a transparent base having a decoration surface and an adhesive layer, adhering the decoration surface of the transparent base to the decoration pattern layer of the first multilayer film by the adhesive layer, to form a second multilayer film; curing the decoration pattern layer by an UV curing process; and removing the transparent film and the releasing film to form a decoration glass.

FIG. 1 illustrates a first embodiment of a decoration glass 100 includes a transparent base 10, an adhesive layer 20, a decoration pattern layer 30, and a coating layer 40.

A shape of the transparent base 10 can be a simple shape, such as prismatic shape, spherical shape, or cylindrical shape, and also can be a complicated shape, such as humanoid, animal shapes, flower shape or bird shape. The transparent base 10 can be made of ordinary glass or tempered glass. The transparent base 10 includes at least one decoration surface 101. In this embodiment, the decoration surface 101 is an inner surface of the transparent base 10.

The adhesive layer 20 is adhered to the decoration surface 101. A thickness range of the adhesive layer 20 is about 5 micrometers to about 50 micrometers, preferably, is about 5 micrometers. In this embodiment, the adhesive layer 20 is made of transparent and colorless material, and is cured by UV curing glue. In this embodiment, the adhesive layer 20 is UV curing glass cement, such as UV curing shadowless glass cement.

The decoration pattern layer 30 is adhered to the decoration surface 101 by the adhesive layer 20. A thickness range of the decoration pattern layer 30 is about 5 micrometers to about 50 micrometers, preferably, is about 15 micrometers. A decoration pattern of the decoration pattern layer 30 can be portrait, landscape, animal, auspicious pattern, graining pattern, leather pattern, or 3D image. Colors of the decoration pattern layer 30 can be single color or color combinations. In this embodiment, a plurality of pattern gap 301 is defined in the decoration pattern layer 30, and the adhesive layer 20 is filled into the pattern gap 301. The decoration pattern layer 30 is cured by UV curing ink.

The coating layer 40 covers a surface of the decoration pattern layer 30 away from the decoration surface 101 to protect the decoration pattern layer 30. In this embodiment, the coating layer 40 also covers the adhesive layer 20 in the pattern gap 301. A thickness range of the coating layer 40 is about 5 micrometers to about 50 micrometers, preferably, is about 10 micrometers. The coating layer 40 can be made of rigid resin, such as acrylic glass or polymethylmethacrylate (PMMA).

In other embodiment, the pattern gap 301 can be omitted, thus, the coating layer 40 is not contact with the adhesive layer 20.

Figure 2A:
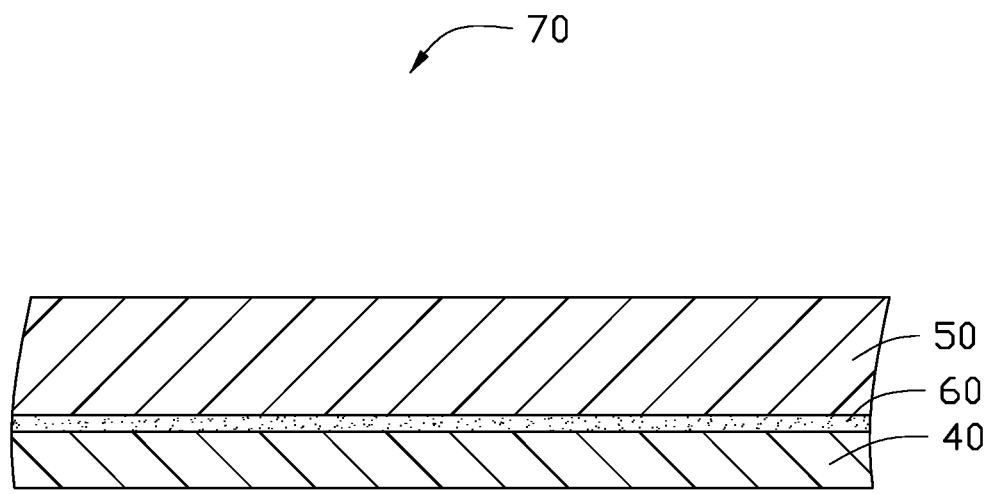
FIGS. 2a, 2b, and 2c illustrate a method to form the decoration glass of FIG. 1 according to a second embodiment.
Figure 2B:
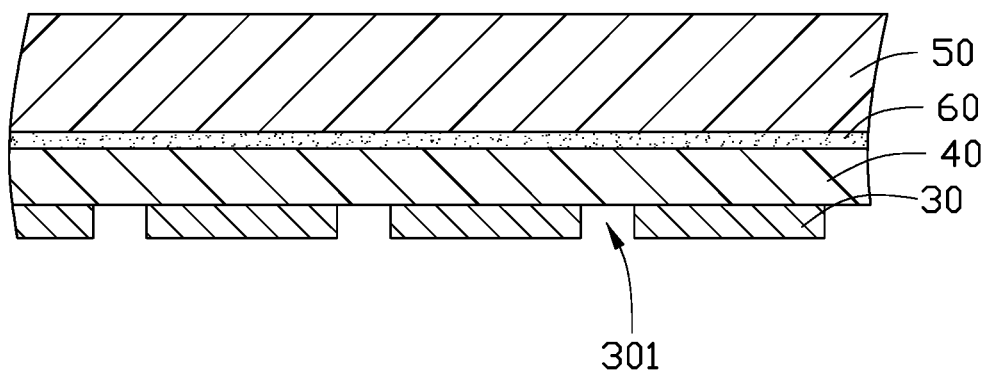
Figure 2C:
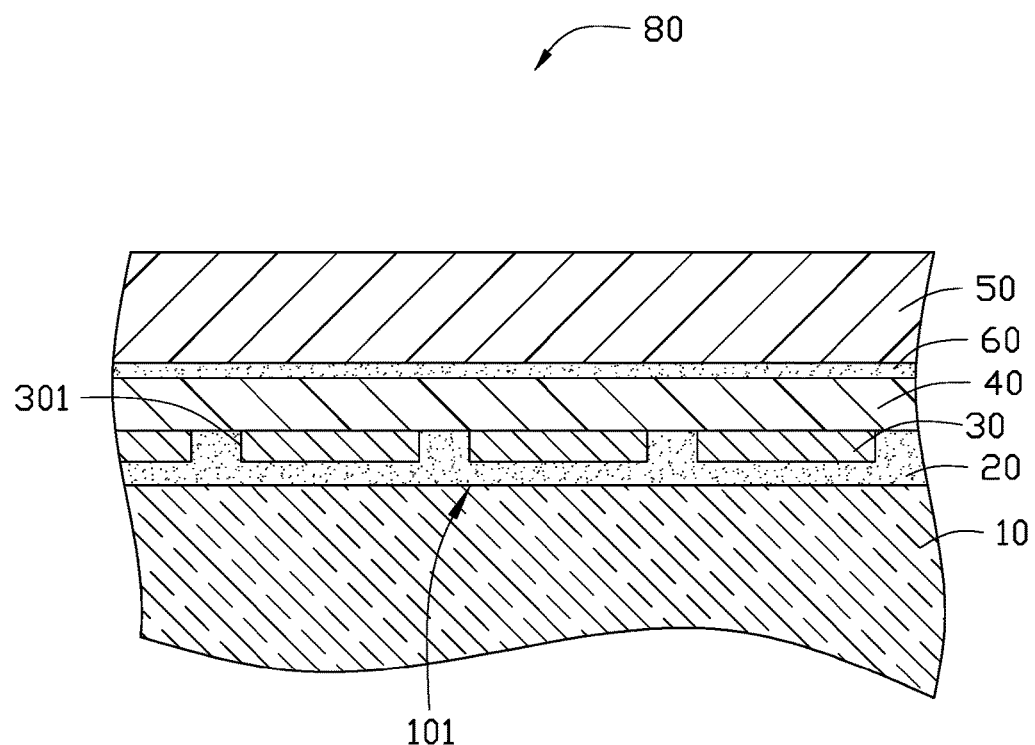
Figure 3:
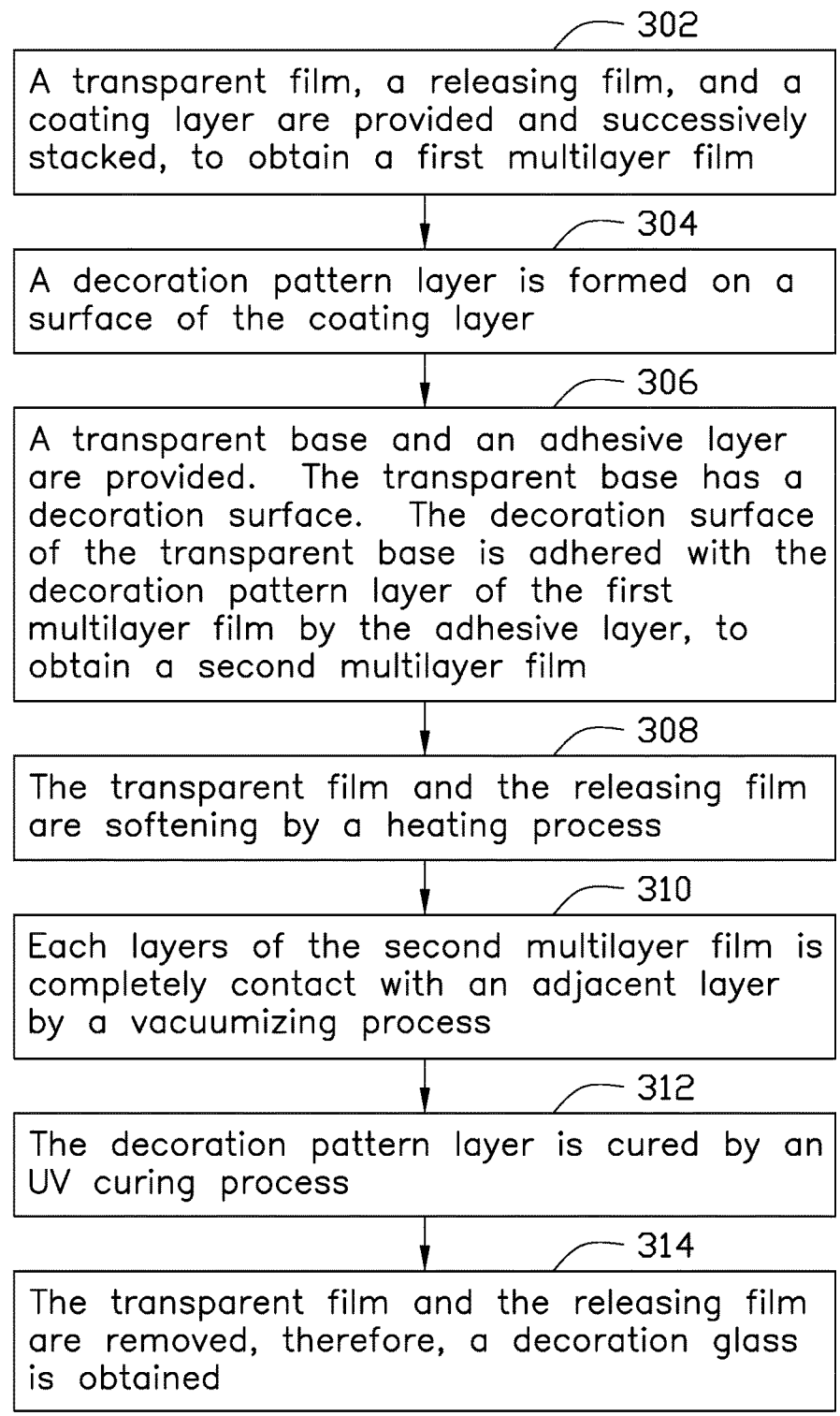
FIG. 3 is a flowchart for manufacturing the decoration glass of FIG. 1 according to the second embodiment.

Referring to FIG. 3, a flowchart is presented in accordance with an exemplary embodiment for manufacturing the decoration glass 100. The exemplary method is provided by way of example, as there are a variety of ways to carry out the method. The method described below can be carried out using the configurations illustrated in FIGS. 2a, 2b, 2c and 1, and various elements of these figures are referenced in explaining the exemplary method. Each block shown in FIG. 3 represents one or more processes, methods, or subroutines, carried out in the exemplary method. Additionally, the illustrated order of blocks is by example only and the order of the blocks can change.

At block 302, a transparent film, a releasing film, and a coating layer are provided and successively stacked to form a first multilayer film.

FIG. 2a illustrates that a transparent film 50, a releasing film 60, and a coating layer 40 are successively stacked to form a first multilayer structure 70. In this embodiment, the transparent film 50 is made of polyolefin (PO). A thickness range of the transparent film 50 is about 100 micrometers to about 200 micrometers, preferably, is about 125 micrometers. The releasing film 60 can be a film with low adherence to adhered to the transparent film 50 and the coating layer 40, and to easily be removed. A thickness range of the releasing film 60 is about 1 micrometer to about 10 micrometers, preferably, is about 5 micrometers.

The transparent film 50, the releasing film 60, and the coating layer 40 in thickness of this embodiment provide support and transmittance.

In other embodiment, the first multilayer structure 70 may have more layers.

At block 304, a decoration pattern layer 30 is formed on a surface of the coating layer 40.

FIG. 2b illustrates that a decoration pattern layer 30 is formed on a surface of the coating layer 40. The decoration pattern layer 30 is formed by inkjet, or screen printing. The decoration pattern layer 30 is made of UV curing ink.

At block 306, a transparent base 10 having a decoration surface and an adhesive layer 20 are provided. The decoration surface of the transparent base 10 is adhered to the decoration pattern layer 30 of the first multilayer film by the adhesive layer 20, to form a second multilayer film 80.

FIG. 2c illustrates that a transparent base 10 is formed on a surface of the decoration pattern layer 30 through an adhesive layer 20, therefore, a second multilayer film 80 is obtained. The transparent base 10 includes a decoration surface 101, and the decoration surface 101 is cleaned before forming on the surface of the decoration pattern layer 30.

At block 308, the transparent film 50 and the releasing film 60 are softened by a heat-softening process.

In this embodiment, the transparent film 50 and the releasing film 60 are softened by the heat-softening process in a heating temperature in a range of about 80 degree Celsius to about 150 degree Celsius.

At block 310, the second multilayer film 80 is received in a vacuum cavity, therefore, each layer of the second multilayer film 80 can be completely in contact with at least an adjacent layer by a vacuuming process.

At block 312, the decoration pattern layer 30 is cured by an UV curing process. In this embodiment, UV light is passed through the transparent layer 50 to cure the adhesive layer 20 and the decoration pattern layer 30. The adhesive layer is also cured by the UV curing process.

At block 314, the transparent film 50 and the releasing film 60 are removed, therefore, a decoration glass 100 is obtained.

FIG. 1 illustrates that the decoration pattern layer 30 is embedded by the coating layer 40.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method of manufacturing a decoration glass, comprising:
   providing and successively stacking a transparent film, a releasing film, and a coating layer to form a first multilayer film;
   forming a decoration pattern layer on a surface of the coating layer, the decoration pattern layer being made of UV curing ink;
   providing a transparent base having a decorative surface thereon and an adhesive layer, and adhering the decoration surface of the transparent base to the decoration pattern layer of the first multilayer film by the adhesive layer to form a second multilayer film;
   curing the decoration pattern layer by an UV curing process; and
   removing the transparent film and the releasing film to form a decoration glass.

2. The method of claim 1, wherein before curing the decoration pattern layer, each layer of the second multilayer film is completely in contact with at least an adjacent layer by a vacuuming process.

3. The method of claim 2, wherein before the vacuuming process, the transparent film and the releasing film of the second multilayer film are softened by a heat-softening process.

4. The method of claim 3, wherein the transparent film and the releasing film of the second multilayer film are softened by the heat-softening process at a heating temperature in a range of about 80 degree Celsius to about 150 degree Celsius.

5. The method of claim 1, wherein the transparent film is polyolefin, and has a thickness in a range of about 100 micrometers to about 200 micrometers.

6. The method of claim 1, wherein the releasing film is a film with low adherence, and has a thickness in a range of about 1 micrometer to about 10 micrometers.

7. The method of claim 1, wherein a thickness range of the decoration pattern layer is about 5 micrometers to about 50 micrometers, and a thickness range of the coating layer is about 5 micrometers to about 50 micrometers.

8. The method of claim 1, wherein the coating layer is a rigid resin.

9. The method of claim 8, wherein the coating layer is an acrylic glass.

10. The method of claim 1, wherein the decoration pattern layer defines a plurality of pattern gap therein, and the adhesive layer is filled into the pattern gap to adhere to a portion of the coating layer.

11. The method of claim 1, wherein the adhesive layer is a transparent and colorless material, and a thickness range of the adhesive layer is about 5 micrometers to about 50 micrometers.

12. The method of claim 1, wherein the adhesive layer is UV curing glass cement.

* * * * *